(12) United States Patent
Dou et al.

(10) Patent No.: US 7,714,812 B2
(45) Date of Patent: May 11, 2010

(54) DRIVING CIRCUIT FOR PROVIDING CONSTANT CURRENT

(75) Inventors: Kai Dou, Guangdong (CN);
Zhang-Xiang Hu, Guangdong (CN);
Cho-Chuan Yang, Guangdong (CN);
Zhao-Cai Zhang, Guangdong (CN);
Jian-De Qing, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 732 days.

(21) Appl. No.: 11/564,279

(22) Filed: Nov. 28, 2006

(65) Prior Publication Data
US 2008/0122385 A1    May 29, 2008

(51) Int. Cl.
*G09G 3/30* (2006.01)

(52) U.S. Cl. .................. 345/76; 345/82; 315/169.3

(58) Field of Classification Search ............ 345/76–82, 345/690, 204
See application file for complete search history.

(56) References Cited

U.S. PATENT DOCUMENTS

| | | | |
|---|---|---|---|
| 6,528,951 B2 * | 3/2003 | Yamazaki et al. | 315/169.3 |
| 6,628,252 B2 | 9/2003 | Hoshino et al. | |
| 7,002,547 B2 * | 2/2006 | Yamada | 345/102 |
| 7,034,607 B2 | 4/2006 | Otake | |

* cited by examiner

*Primary Examiner*—Duc Q Dinh
(74) *Attorney, Agent, or Firm*—Winston Hsu

(57) ABSTRACT

A driving circuit comprising a reference-voltage circuit, an amplifier, an adjusting circuit, and a current-setting circuit. The reference-voltage circuit is used for generating a reference voltage. The amplifier comprises a first input terminal used for receiving the reference voltage, a second input terminal used for receiving feedback voltage from a load, and an output terminal used for outputting an output current to the load. The adjusting circuit is used for adjusting a voltage of the load when a resistance of the load changes. The current-setting circuit is used for setting a value of the output current based on the feedback voltage.

9 Claims, 4 Drawing Sheets

DRIVING CIRCUIT FOR PROVIDING CONSTANT CURRENT

BACKGROUND OF THE INVENTION

1. Field of the Invention

The present invention relates to driving circuits, and particularly to a driving circuit for providing a constant current.

2. Description of Related Art

Many electronic devices use driving circuits to provide constant currents. Portable electronic devices with display panels need a light source or sources to display pictures and other characters on the display. A matrix of light-emitting diodes (LEDs) are widely used as the light sources for these displays. Each LED in the matrix emits light by passing a current through a positive end and a negative end of the diode. A power of the light, influencing a brightness of the display, is directly proportional to the forward current. The driver circuit keeps the voltage and current constant so that the power of the LED light is constant.

Referring to FIG. 4, a traditional constant voltage driving circuit 100 includes a constant voltage source 110, a resistor 120, and an LED 130. The constant voltage source 110, the resistor 120, and the LED 130 are electrically connected in series. An anode of the constant voltage source 110 is electrically connected to the resistor 120, and a cathode of the constant voltage source 110 is electrically connected to ground. A positive end of the LED 130 is electrically connected to the resistor 120, and a negative end of the LED 130 is electrically connected to ground. Herein, a voltage of the constant voltage source 110 is labeled $V_{BB}$, and a voltage of the LED 130 is labeled $V_{F1}$, and a resistance of the resistor 120 is labeled $R_1$. A forward current of the LED 130 is indicated with $I_{F1}$. Thus, $I_{F1}$ can be expressed in the following formula 1.

$$I_{F1}=(V_{BB}-V_{F1})/R_1 \quad\quad 1$$

The LED 130 actuated by the constant voltage source 110 emits light with a constant power. However, when the LED 130 is in use for a long time, a temperature of the LED 130 increases and so does $V_{F1}$. Therefore, according to formula 1, $I_{F1}$ decreases, and a change of the power of the light occurs.

Moreover, $V_{F1}$ often changes due to other factors such as signal noise. Once $V_{F1}$ changes, $I_{F1}$ also changes. In general, when $V_{F1}$ changes 11%, $I_{F1}$ changes 30%. Amplitude of the change of $I_{F1}$ cannot be acceptable in practice.

Commonly, voltages of other loads often change as well as the LEDs while in use, making currents of the loads unstable. Therefore, the voltage driving circuit 100 cannot provide a constant current.

Therefore, a driving circuit is needed in the industry to address the aforementioned deficiencies and inadequacies.

SUMMARY OF THE INVENTION

A driving circuit comprising a reference-voltage circuit, an amplifier, an adjusting circuit, and a current-setting circuit. The reference-voltage circuit is used for generating a reference voltage. The amplifier comprises a first input terminal used for receiving the reference voltage, a second input terminal used for receiving feedback voltage from a load, and an output terminal used for outputting an output current to the load. The adjusting circuit is used for adjusting a voltage of the load when a resistance of the load changes. The current-setting circuit is used for setting a value of the output current based on the feedback voltage.

Other systems, methods, features, and advantages of the present driving circuit will become apparent to one with ordinary skill in the art upon examination of the following drawings and detailed description. It is intended that all such additional systems, methods, features, and advantages be included within this description, be within the scope of the present device, and be protected by the accompanying claims.

BRIEF DESCRIPTION OF THE DRAWINGS

Many aspects of the present driving circuit can be better understood with reference to the following drawings. The components in the drawings are not necessarily to scale, emphasis instead being placed upon clearly illustrating the principles of the present device. Further, in the drawings, like reference numerals designate the same parts throughout the several views.

DETAILED DESCRIPTION OF THE INVENTION

Reference will now be made to the drawings to describe a preferred embodiment of the present driving circuit.

Figure 1:
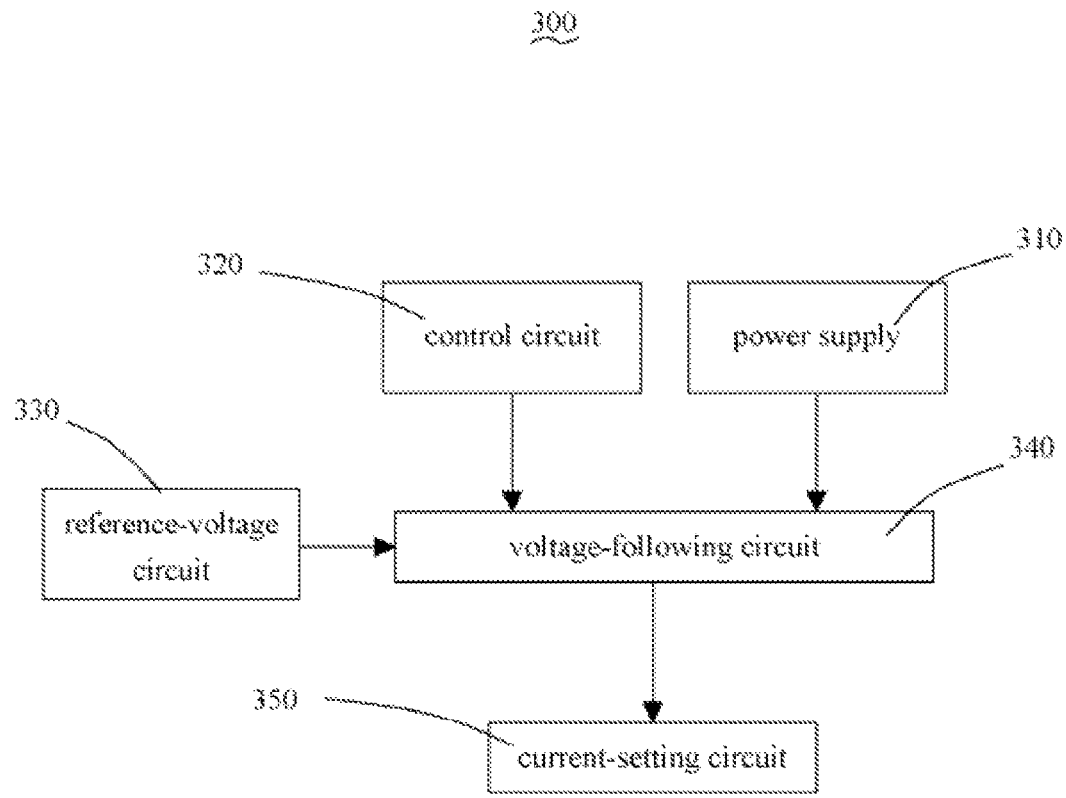
FIG. 1 is a block diagram showing a driving circuit in accordance with an exemplary embodiment, the driving circuit including a voltage-following circuit.

Referring to FIG. 1, a driving circuit 300 includes a power supply 310, a control circuit 320, a reference-voltage circuit 330, a voltage-following circuit 340, and a current-setting circuit 350. The voltage-following circuit 340 is electronically connected to the power supply 310, the control circuit 320, the reference-voltage circuit 330, and the current-setting circuit 350 respectively.

The power supply 310 is for supplying a working voltage to the voltage-following circuit 340. The control circuit 320 is for supplying an initial voltage to start the voltage-following circuit 340. The reference-voltage circuit 330 is for supplying a reference voltage to the voltage-following circuit 340. The voltage-following circuit 340 is for supplying an output current. The current-setting circuit 350 is for setting a value of the output current.

Figure 2:
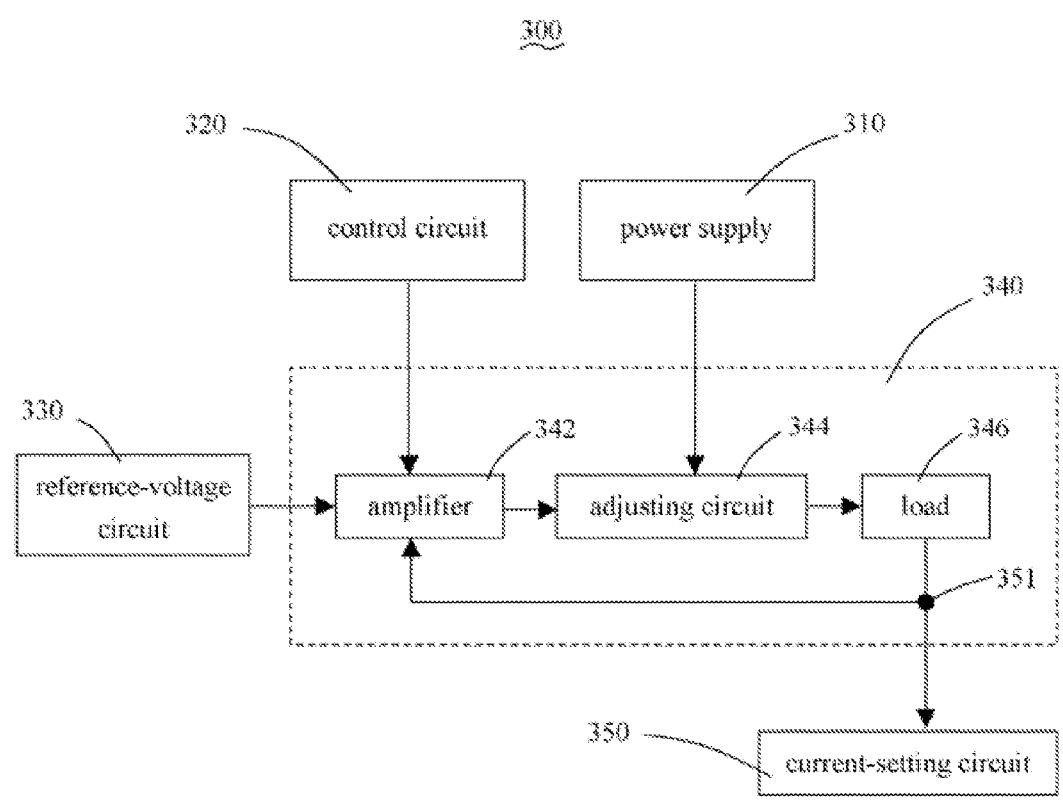
FIG. 2 is a block diagram showing a structure of the voltage-following circuit in the driving circuit of FIG. 1.

Also referring to FIG. 2, the voltage-following circuit 340 includes an amplifier 342, an adjusting circuit 344, and a load 346. The voltage-following circuit 340 also has a node 351. The amplifier 342 is electronically connected to the control circuit 320, the reference-voltage circuit 330, the adjusting circuit 344, and the node 351. The adjusting circuit 344 is electronically connected to the power supply 310, the amplifier 342, and the load 346. The load 346 is electronically connected to the node 351. The node 351 is electronically connected to the current-setting circuit 350.

The amplifier 342 is used for outputting a control signal to the adjusting circuit 344. The adjusting circuit 344 is for controlling the working voltage from the power supply 310 to the load 346. The adjusting circuit 344 regulates the voltage as the resistance of the load 346 changes with temperature. The load 346 is for receiving the working voltage, and sending a feedback voltage to the amplifier 342 via the node 351. The current-setting circuit 350 is for setting the value of a current to a load based on the feedback voltage of the node 351.

The amplifier 342, the adjusting circuit 344, and the load 346 are used to include a negative feedback circuit. The negative feedback circuit keeps a voltage of an inverting input equaling a voltage of a noninverting input of the amplifier 342. Thus, the feedback voltage of the node 351 equals the reference voltage.

Figure 3:
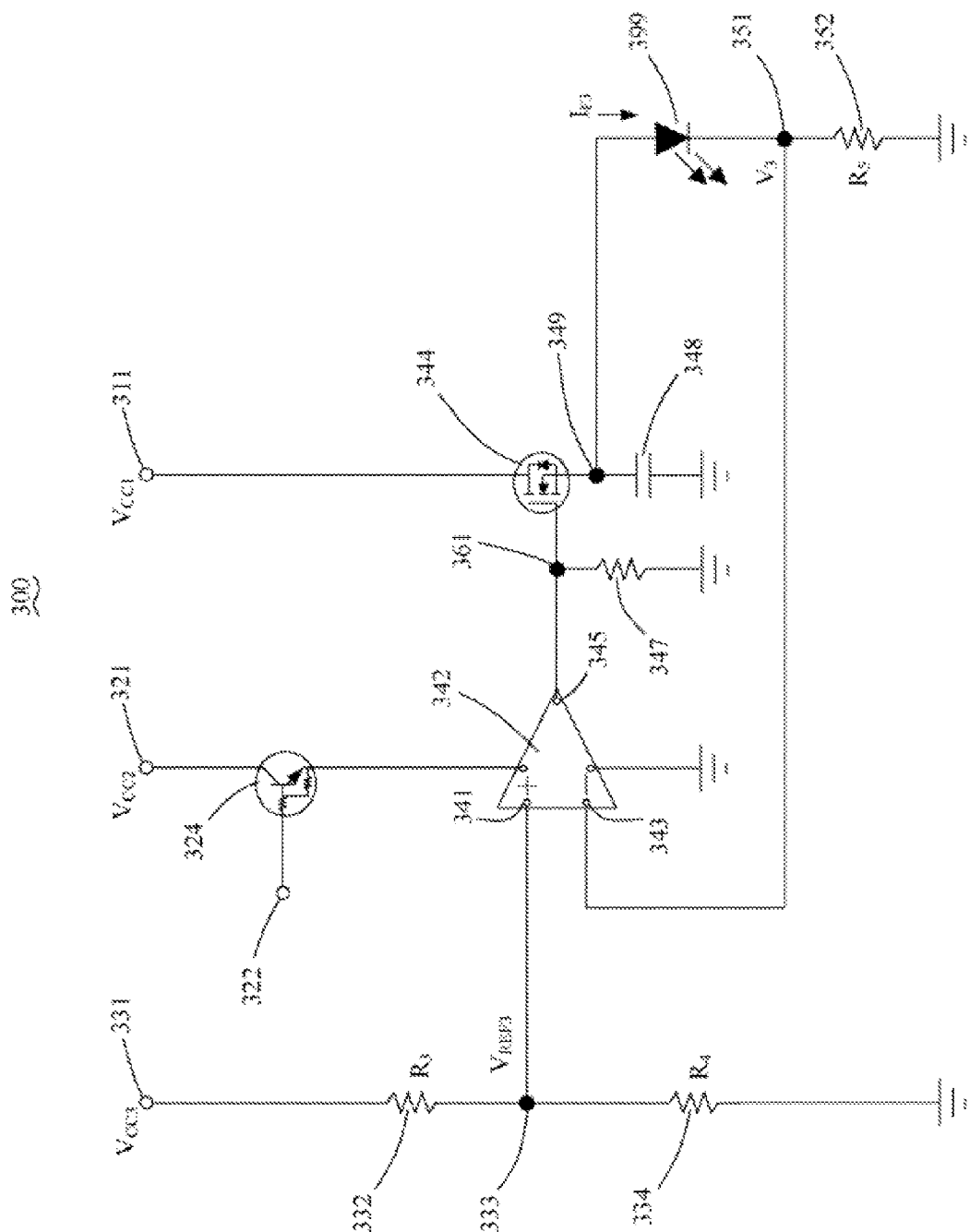
FIG. 3 is a schematic diagram showing a preferred embodiment with a concrete structure of the driving circuit of FIG. 2.
Figure 4:
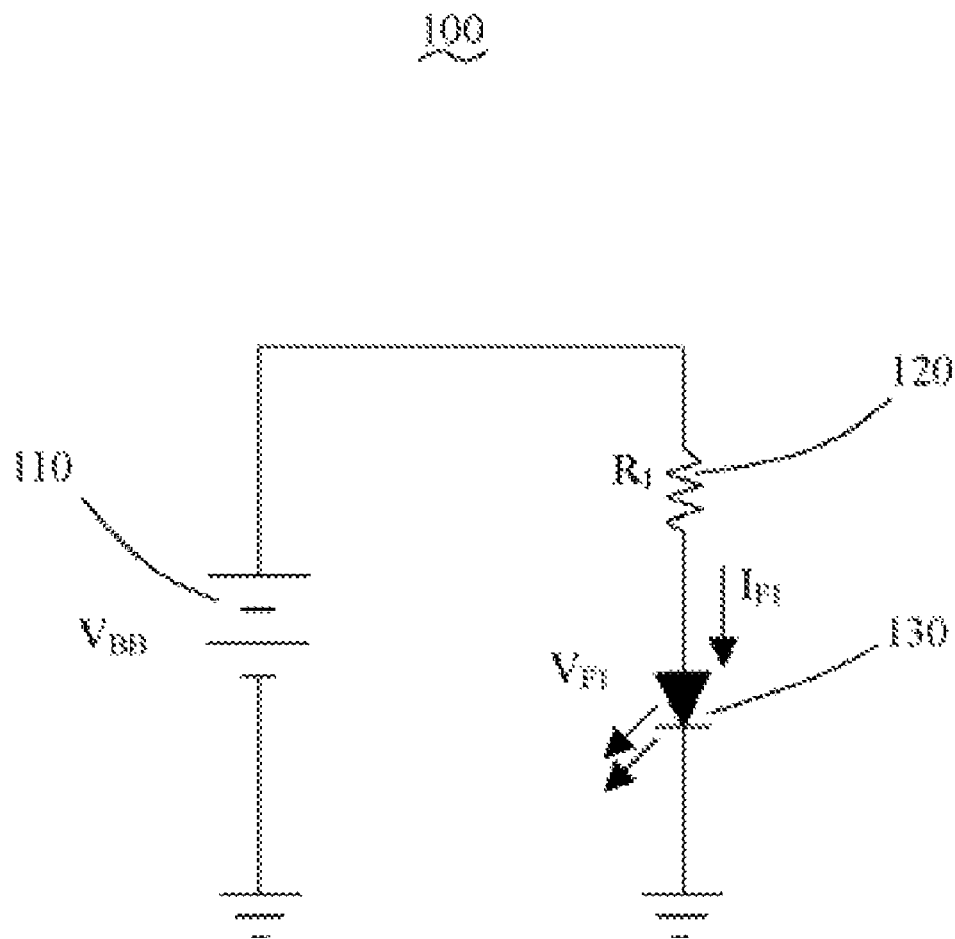
FIG. 4 is a schematic diagram showing a traditional constant voltage driving circuit.

Referring to a preferred embodiment of the driving circuit 300 of FIG. 4. The load 346 of FIG.3 is shown as LED 399. The driving circuit 300 includes a signal-input terminal 322 and power-input terminals 311, 321, and 331. The power-input terminal 311 is used for receiving the working voltage from the power supply 310. The power-input terminals 321 and 331 are used for receiving power from other power supplies (not shown). In other embodiments, the power-input terminals 321 and 331 can also receive the working voltage from the power supply 310. The power-input terminal 311 is used for receiving a trigger signal. In this embodiment, the trigger signal is a high level signal.

The power-input terminal 311 is electronically connected to a drain of a metal-oxide semiconductor field-effect transistor (MOSFET) 344. The power-input terminal 321 is electronically connected to a collector of an npn bipolar junction transistor (BJT) 324. A base of the npn BJT 324 is electronically connected to the signal-inputting terminal 322, and an emitter of the npn BJT 324 is electronically connected to the amplifier 342. A pin of the amplifier 342 is connected to ground. The power-input terminal 331 is electronically connected to an end of a resistor 332, and another end of the resistor 332 is electronically connected to a node 333. The node 333 is connected to ground via a resistor 334, and also electronically connected to a first input terminal 341 of the amplifier 342.

An output terminal 345 of the amplifier 342 is electronically connected to a node 361. The node 361 is electronically connected to a gate of the MOSFET 344, and is connected to ground via a resistor 347. A source of the MOSFET 344 is electronically connected to a node 349. The node 349 is electronically connected to an end of a capacitor 348, and another end of the capacitor 348 is connected to ground. The node 349 is also electronically connected to a positive end of the LED 399. A negative end of the LED 399 is electronically connected to the node 351. The node 351 is electronically connected to a second input terminal 343 of the amplifier 342, and also connected to ground via a resistor 352.

In the embodiment, the working voltage is labeled $V_{CC1}$. The voltage received by the power-input terminal 321 is labeled $V_{CC2}$, and the voltage received by the power-input terminal 331 is labeled $V_{CC3}$. The reference voltage of the node 333 is labeled $V_{REF3}$, and the voltage of the node 351 is labeled $V_3$. Resistances of the resistor 332, the resistor 334, and the resistor 352 are respectively labeled $R_3$, $R_4$, and $R_5$. A forward current of the LED 399 is labeled $I_{F3}$. Thus, $V_{REF3}$ can be expressed in a formula 2 as follows:

$$V_{REF3}=V_{CC3}*R_4/(R_3+R_4) \qquad 2$$

When the signal-inputting terminal 322 receives the trigger signal, the npn BJT 324 turns on. The amplifier 342 receives the initial voltage from the npn BJT 324, and starts working.

The amplifier 342 outputs the control signal to the gate of the MOSFET 344. The MOSFET 344 turns on, allowing $I_{F3}$ to pass through the LED 399, the node 351, and the resistor 352 sequentially. The resistor 347 electrically connected to the node 361 and ground is for maintaining a low level of the node 361 when the driving circuit 300 does not work. The capacitor 348 is used for filtering out noise at the node 361. $I_{F3}$ can be expressed in a formula 3:

$$I_{F3}=V_3/R_5 \qquad 3$$

Because $V_3$ is approximately equal to $V_{REF3}$, $I_{F3}$ can also be expressed in following formula 4:

$$I_{F3}=V_{REF3}/R_5 \qquad 4$$

Therefore, the forward current of the LED 399 depends on the reference voltage of the node 333 and the resistance of the resistor 352. Even if the LED 399 keeps working for a long time, and a temperature of the LED 399 increases, the forward current is not influenced by an increased temperature of the LED 399.

In the aforementioned embodiment, the MOSFET 344 also has an voltage-adjusting function. Hereinafter, the voltage-adjusting function is explained. For instance, if the LED 399 is replaced with two serial LEDs, a resistance between the node 349 and the node 351 increases. Since the voltage of the node 349 does not change abruptly in a short interval of the replacing operation, the forward current $I_{F3}$ decreases. Thus, the voltage $V_3$ of the node 351 decreases. When $V_3$ is less than $V_{REF3}$, a value of the control signal increases, and the voltage of the node 361 and the gate of the MOSFET 344 increases. Therefore, a current of the drain of the MOSFET 344 increases, and a voltage of the source of the MOSFET 344 increases. Finally, when the driving circuit 300 stabilizes, the forward current $I_{F3}$ returns to an initial value prior to the replacement operation. It can be concluded that the MOSFET 342 can adjust the voltage of the source in order to keep the forward current $I_{F3}$ constant.

It should be emphasized that the above-described preferred embodiment, is merely a possible example of implementation of the principles of the invention, and is merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and be protected by the following claims.

What is claimed is:

1. A driving circuit for driving a load, the driving circuit comprising:
    a reference-voltage circuit for generating a reference voltage;
    an amplifier comprising a first input terminal for receiving the reference voltage, a second input terminal for receiving a feedback voltage from the load, and an output terminal for outputting a high level signal;
    an adjusting circuit for adjusting a voltage of the load when a resistance of the load changes, wherein the adjusting circuit comprises a metal-oxide semiconductor field-effect transistor comprising a gate electrically connected to the output terminal of the amplifier for receiving the high level signal, a source electrically connected to the load for outputting an output current, and a drain; and a current-setting circuit for setting a value of the output current based on said feedback voltage;
    wherein the current-setting circuit comprises a first resistor, and one end of the first resistor is electronically connected to said second input terminal, and another end of the first resistor is connected to ground.

2. The driving circuit according to claim 1, further comprising a power supply, wherein said power supply is used for generating a working voltage to be sent to said adjusting circuit, the drain of the metal-oxide semiconductor field-effect transistor is electrically connected to the power supply.

3. The driving circuit according to claim 2, further comprising a control circuit for generating an initial voltage, and driving the amplifier to work based on the initial voltage.

4. The driving circuit according to claim 3, wherein the control circuit comprises an npn bipolar junction transistor, a base of the npn bipolar junction transistor is used for receiving a high level signal, and a collector of the npn bipolar junction transistor is electronically connected to the power supply, and an emitter is electronically connected to the amplifier.

5. The driving circuit according to claim 2, wherein the reference-voltage circuit is configured for receiving the working voltage, and converting the working voltage to the reference voltage.

6. The driving circuit according to claim 5, wherein the reference voltage circuit comprises a second resistor and a third resistor, the second resistor and the third resistor are electronically serially connected to divide the working voltage.

7. A driving circuit for outputting an output current to a LED based on a reference voltage, the driving circuit comprising:
    an amplifier comprising a first input terminal for receiving the reference voltage, a second input terminal, and an output terminal for outputting a high level signal;
    an adjusting circuit for adjusting a voltage of a positive end of the LED; and a current-setting circuit for setting a value of the output current;
    wherein a negative end of the LED is electronically connected to the second input terminal of the amplifier, and an interconnection between the negative end of the LED and the second input terminal of the amplifier is electronically connected to the current-setting circuit, the adjusting circuit comprises a metal-oxide semiconductor field-effect transistor comprising a gate electrically connected to the output terminal of the amplifier for receiving the high level signal, a source electronically connected to the positive end of the LED, and a drain;
    wherein the current-setting circuit comprises a resistor, and one end of the resistor is electronically connected to the negative end of the LED, and the other end of the resistor is connected to ground.

8. The driving circuit according to claim 7, further comprising a power supply electronically connected to the drain.

9. The driving circuit according to claim 8, further comprising a control circuit comprising an npn bipolar junction transistor, wherein the npn bipolar junction transistor comprises a base for receiving a high level signal, a collector electronically connected to the power supply, and an emitter electronically connected to the amplifier.

* * * * *